United States Patent [19]

Nagler et al.

[11] Patent Number: 5,247,352
[45] Date of Patent: Sep. 21, 1993

[54] APPARATUS AND METHOD CAPABLE OF USING SEVERAL SHARPENED COLOR SIGNALS TO SHARPEN EACH COLOR COMPONENT OF A COLOR IMAGE

[75] Inventors: Michael Nagler, Ramat Aviv; Haim Z. Melman, Kfar Sava, both of Israel

[73] Assignee: Scintex Corporation Ltd., Herzlia, Israel

[21] Appl. No.: 683,268

[22] Filed: Apr. 10, 1991

[30] Foreign Application Priority Data

Apr. 26, 1990 [IL] Israel .................................. 94215
Jul. 3, 1990 [IL] Israel .................................. 94956

[51] Int. Cl.⁵ .................................................. G03F 3/08
[52] U.S. Cl. ................................. 358/515; 358/37
[58] Field of Search ............................... 358/37, 75–80

[56] References Cited

U.S. PATENT DOCUMENTS

| | | | |
|---|---|---|---|
| 4,335,407 | 6/1982 | Atoji et al. | 358/284 |
| 4,672,431 | 6/1987 | Cosgrove | 358/37 |
| 4,734,763 | 3/1988 | Urabe et al. | 358/80 |
| 4,841,362 | 6/1989 | Urabe et al. | 358/80 |
| 4,972,256 | 10/1990 | Hirosawa et al. | 358/80 |

OTHER PUBLICATIONS

L. L. Jackson, "Unsharp Masking—Photographic/Electronic", Gaftworld, May–Jun. 1989, vol. 1, pp. 13–22.
R. K. Molla, "Electronic Color Separation", R. K. Printing & Publishing Co., Montgomery, W. Va., 1988, pp. 230–232.
G. Wyszecki et al., "Color Science: Concepts and Methods, Quantitative Data and Formulae", John Wiley & Sons, N.Y., 1989, 2nd edition, pp. 507–510.

Primary Examiner—Stephen Brinich
Attorney, Agent, or Firm—Darby & Darby

[57] ABSTRACT

An apparatus for sharpening a color image having a multiplicity of color separation signals defining a plurality of color pixels comprising apparatus for generating at least two sharpening signals from the color separation signals and apparatus for combining each of the color separation signals with any collection of the at least two sharpening signals wherein the collection changes throughout the color image.

17 Claims, 4 Drawing Sheets

APPARATUS AND METHOD CAPABLE OF USING SEVERAL SHARPENED COLOR SIGNALS TO SHARPEN EACH COLOR COMPONENT OF A COLOR IMAGE

FIELD OF THE INVENTION

The present invention relates to detail enhancement of color images generally.

BACKGROUND OF THE INVENTION

Analog and digital detail enhancement, known as "unsharp masking", is well known and widely used in the graphic arts, as well as in other fields. It is used to produce sharp printed reproductions from original images by enhancing the color density differences at edges between areas of different color and is discussed in the following publications:

Jackson, Lonnie L., "Unsharp Masking: Photographic/Electronic," *Gatfworld*, May–June 1989, Vol. 1, pp. 13–22;

Molla, R. K., *Electronic Color Separation*, R. K. Printing & Publishing Co., Montgomery, W. Virginia, 1988, pp. 230–232; and U.S. Pat. No. 4,335,407 to Atoji et al.

Two methods are used for detail enhancement, the utilization of a single color channel to produce a single detail enhancement signal for each of three or four color channels or for each of the three or four printers and the utilization of each color channel to produce a separate detail enhancement signal per channel. These two methods can be implemented in both analog and digital systems, such as color separation scanners.

The first method adds to the enhanced edges a generally gray line, making the edge of a color area appear to be more gray. This effect, often referred to as "contours", is undesirable for most graphic arts applications.

The second method adds a color enhancing line to the edge of a color area, thereby generally enhancing the color separation of the area at the edge to more sharply define the color edge. This effect is desirable and produces printed images of high quality.

The two methods have their advantages and disadvantages, particularly in regard to color noise. When scanning a color area, many pixels are produced to represent the area and the average color of the pixels in the area is the color of the area. However, due to noise that is inherent in the detection process, an individual pixel will typically have a color which is slightly different from the average color of the area. This effect is known as color noise and is easily detected by the human eye, especially when the average color is gray.

The second method emphasizes this effect by adding a color component to each pixel. On the other hand, the first method adds a gray component to each pixel, thereby reducing the color separation in the pixel and consequently, reducing the color noise.

At the edges between gray areas, where typically the Red, Green and Blue components of each gray color are essentially of the same color, both methods provide a sharpening line of the same average color and are, therefore, equivalent. The second method, however, will increase any color noise in the gray areas and the first method will reduce it.

From the above discussion, it is clear that neither method is superior than the other in all situations. The desirability of each method depends on the colors in the image.

SUMMARY OF THE INVENTION

It is, therefore, an object of the present invention to provide an apparatus and method for sharpening a color image which utilizes more than one method of detail enhancement for reproduction of any original image.

There is therefore provided, in accordance with a preferred embodiment of the present invention, an apparatus for sharpening a color image having a multiplicity of color separation signals defining a plurality of color pixels comprising apparatus for generating at least two sharpening signals from the color separation signals and apparatus for combining each of the color separation signals with any collection of the at least two sharpening signals wherein the collection changes throughout the color image.

Additionally, in accordance with a preferred embodiment of the present invention, the apparatus for combining includes apparatus for determining the collection as a function of at least one dimension of the at least three dimensional color value of each of the plurality of pixels.

Moreover, in accordance with an alternative embodiment of the present invention, the apparatus for determining includes apparatus for separating a color solid into first, second and third volumes. If the three dimensional color value of a pixel falls within the first volume, a first collection of sharpening signals are combined with the color separation signals. If the three dimensional color value of a pixel falls within the third volume a second collection of sharpening signals are combined with the color separation signals. If the three dimensional color value of a pixel falls within the second volume, located generally between the first and third volumes, a combination of the first and the second collections of sharpening signals are combined with the color separation signals wherein the combination gradually changes from generally the entirety of the first collection to generally the entirety of the second collection.

Further, in accordance with a preferred embodiment of the present invention, the apparatus for generating includes apparatus for performing edge detection on each of the color separation signals.

Still further, in accordance with a preferred embodiment of the present invention, the color separation signals are in a predetermined color space and the sharpening signals are also in the predetermined color space.

There is additionally provided, in accordance with a preferred embodiment of the present invention, a method of sharpening a color image having a multiplicity of color separation signals defining a plurality of color pixels including the steps of generating at least two sharpening signals from the color separation signals and combining each of the color separation signals with any collection of the at least two sharpening signals wherein the collection changes throughout the color image.

Additionally, in accordance with a preferred embodiment of the present invention, the step of combining includes the step of determining the collection as a function of at least one dimension of the at least three dimensional color value of each of the plurality of pixels.

Moreover, in accordance with an alternative embodiment of the present invention, the step of determining includes the step of separating a color solid into first, second and third volumes. If the three dimensional color value of a pixel falls within the first volume, a first collection of sharpening signals are combined with the color separation signals. If the three dimensional color value of a pixel falls within the third volume a second collection of sharpening signals are combined with the color separation signals. If the three dimensional color value of a pixel falls within the second volume, located generally between the first and third volumes, a combination of the first and the second collections of sharpening signals are combined with the color separation signals wherein the combination gradually changes from generally the entirety of the first collection to generally the entirety of the second collection.

Finally, in accordance with a preferred embodiment of the present invention, the step of generating includes the step of performing edge detection on each of the color separation signals.

BRIEF DESCRIPTION OF THE DRAWINGS

The present invention will be understood and appreciated more fully from the following detailed description taken in conjunction with the drawings in which.

DETAILED DESCRIPTION OF PRESENT INVENTION

Figure 1:
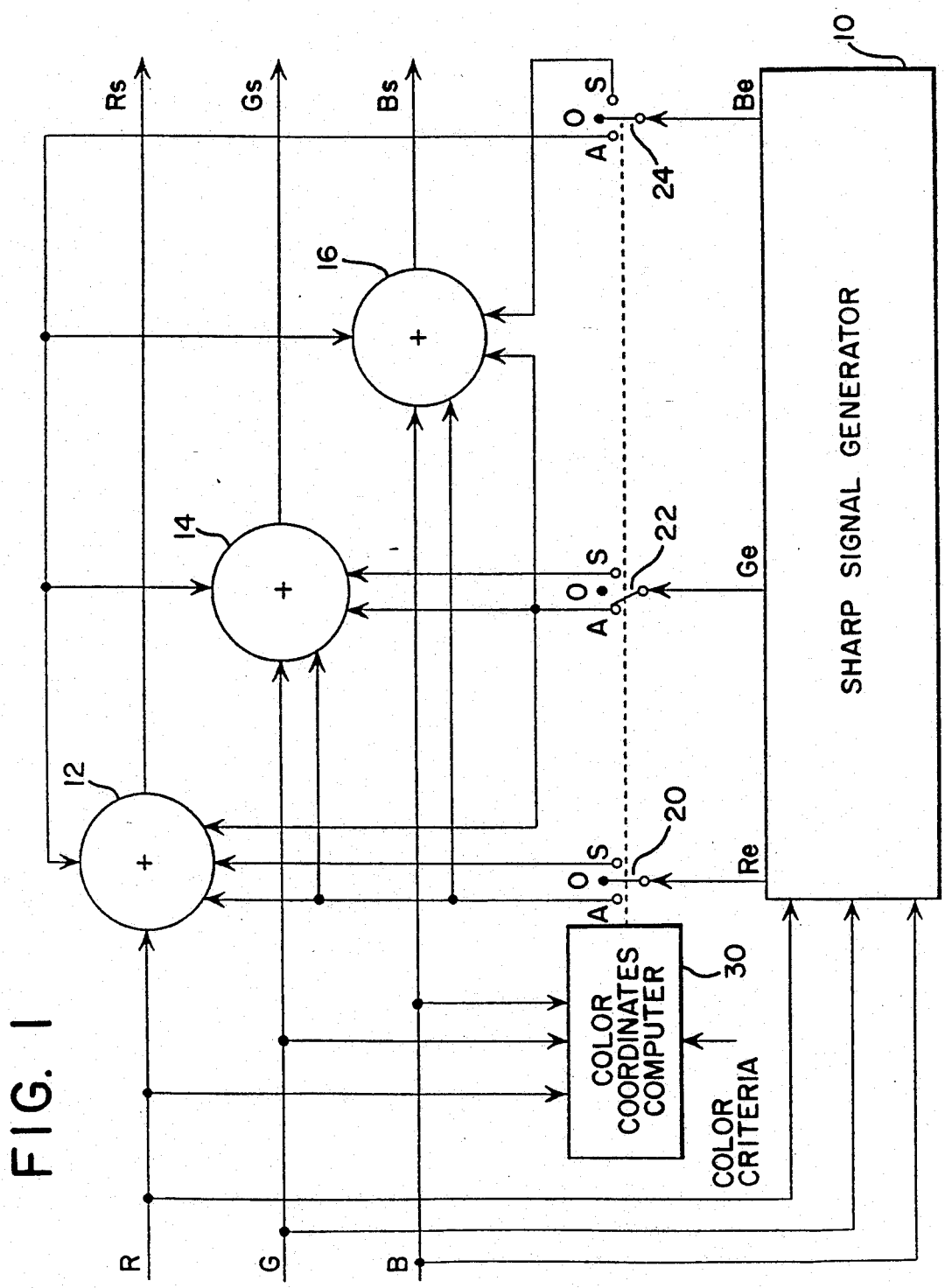
FIG. 1 is a block diagram illustration of a first embodiment of a color sharpening system of the present invention.

Reference is made to FIG. 1 which illustrates, in block diagram form, the system for color sharpening of the present invention.

The system comprises a sharp signal generator 10 for receiving Red (R), Green (G) and Blue (B) color separation signals from a color separation source, such as a color separation scanner or a color separation camera, and for producing sharp signals $R_e$, $G_e$, and $B_e$, respectively, for the Red, Green and Blue color separation signals. Alternatively, the color separation signals can be of the Cyan (C), Magenta (M), Yellow (Y) and Black (K) separation, or of any other suitable color separation. In a system receiving the C, Y, M and K color separation signals, the sharp signal generator 10 produces the sharp signals $C_e$, $M_e$, $Y_e$, and $K_e$. It will be appreciated that the sharp signals are preferably in the same color space as the input color separation signals where, for the following description, the Red, Green and Blue color space will be used.

The system additionally comprises three summers 12, 14 and 16 for receiving a color separation signal from a color separation source, and any or none of sharp signals $R_e$, $G_e$ or $B_e$. The color separation signals received by summers 12, 14 and 16 are respectively, the Red (R), Green (G) and Blue (B) color separation signals.

The sharp signals $R_e$, $G_e$ and $B_e$ are received by summers 12, 14 and 16, via three individually controlled switches 20, 22 and 24, respectively, operative to switch the signals between three positions, A, O and S.

When a switch 20, 22 or 24 is in the O position, it does not connect the respective sharp signal $R_e$, $G_e$ or $B_e$ to any of summers 12, 14 or 16. When a switch is in the S position, the respective sharp signal is connected to the summer receiving the respective color separation signal. Finally, when a switch is in the A position, the respective sharp signal is connected to all of the summers 12, 14 and 16. Each collection of position settings of the switches 20, 22 and 24 is called a mode.

The first method described in the Background of the Invention is the mode wherein one of the switches, typically switch 22 which receives $G_e$, is set to the A position and the remaining switches 20 and 24 are set to the O position. The second method described in the Background of the Invention is the mode wherein each of the switches 20, 22 and 24 is set to the S position.

The switches 20, 22 and 24 are individually operated by a color coordinates computer 30 in accordance with a predefined color criteria. The color criteria define ranges within a three-dimensional color space in which a given mode will be operative. Thus, the color coordinates computer 30 receives the R, G and B color separation signals and, for each pixel, determines where in the three-dimensional color space a given pixel lies. The switch setting for the range within which the given pixel lies will then be implemented.

Figure 3:
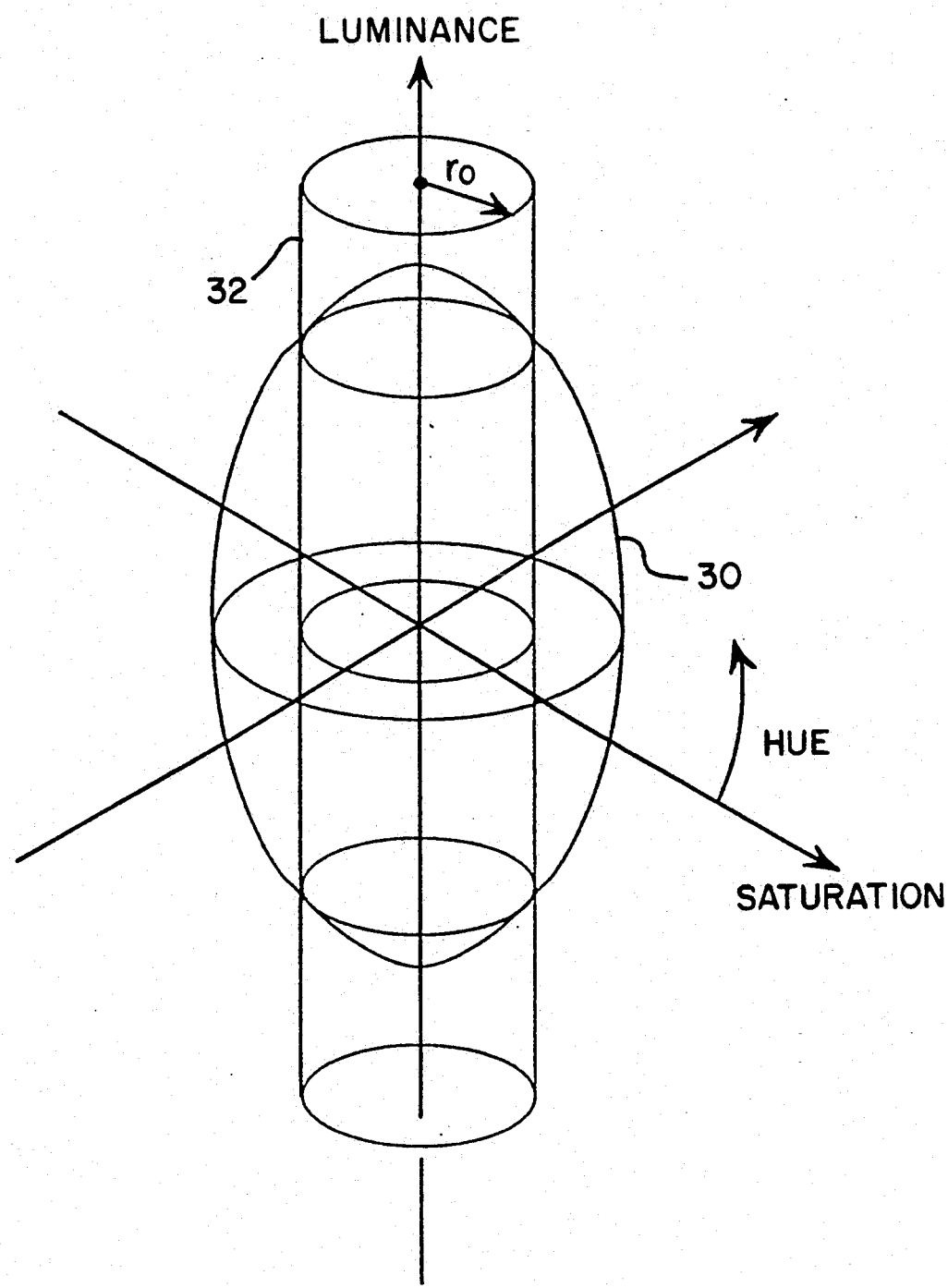
FIG. 3 is a graphic illustration of a Munsell Color Solid useful in the invention of FIGS. 1 and 2.

A typical three-dimensional color space, known as the Munsell Color Solid, is shown in FIG. 3 and marked as reference number 30. It is described on pages 507–510 of the book, *Color Science: Concepts and Methods, Quantitative Data and Formulae*, 2nd Edition, by Gunter Wyszecki and W. S. Stiles and published by John Wiley and Sons, New York, N.Y. in 1982. The vertical axis is the luminance axis, the horizontal plane comprises the polar axes of saturation and hue where saturation is the radial component and hue is the angular component.

A typical, two range color criteria can be defined by intersecting the Munsell Color Solid 30 with a cylinder 32 of radius $r_o$ along the luminance axis. All pixels falling within the intersection of the Solid 30 and the cylinder 32 are relatively gray pixels for which the first method of the Background of the Invention is operative. All pixels not falling within the intersection of the Solid 30 and the cylinder 32 are non-gray pixels for which the second method of the Background of the Invention is operative.

A second, two range color criteria can be defined by defining a volume with luminance higher than a first threshold and lower than a second threshold.

It will be appreciated that, criteria utilizing the Munsell Color Solid 30 require a transformation of the R, G and B color components of each pixel to luminance, hue and saturation components. Other criteria may be defined which are expressed in the R, G and B color coordinates. If more than two color criteria ranges are required, the three-dimensional color solid is divided into smaller, non-overlapping range volumes.

Reference is now made back to FIG. 1. As is known in the art, the sharp signal generator 10 separately performs edge detection and edge signal generation from each of the color separation signals R, G and B. To each detected edge in each of the color separations, it increases the brightness content of the bright side of the edge and decreases the content of the darker side of the edge. Generally, the steeper the edge, the greater the increase and decrease in the color content of the two sides of the edge.

It will be appreciated that the present invention minimally requires the generation of two sharp signals. Typically, the red and green sharp signals, $R_e$ and $G_e$ are generated and one of them is additionally input to switch 24. Furthermore, in color separation sources which utilize the C, M, Y and K color separations to detect edges, the sharp signal generator 10 can generate four sharp signals.

Figure 2:
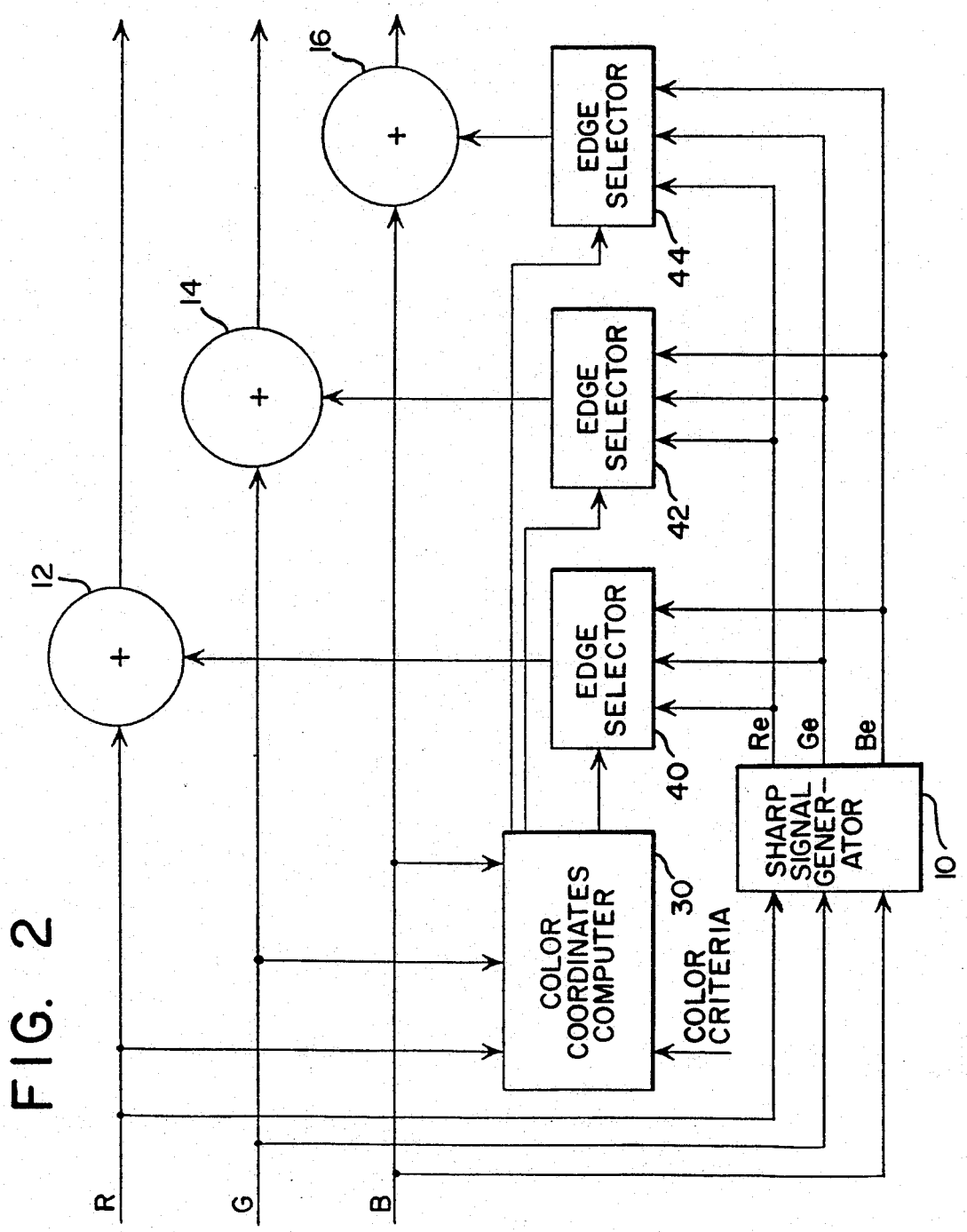
FIG. 2 is a block diagram illustration of a second embodiment of the system of the present invention.

Reference is now made to FIG. 2 which illustrates a further embodiment of the present invention. In this embodiment, the switches 20, 22 and 24 are replaced by edge selectors 40, 42 and 44, respectively. In response to the range in which a given pixel is found, the color coordinates computer 30 indicates to each edge selector 40, 42 and 44 which sharp signal $R_e$, $G_e$ or $B_e$ to select, thereby allowing for 27 different modes of connecting the sharp signals to the channels. Typically, there are defined 27 or fewer volume ranges of the color solid to match the 27 different modes. It will be appreciated that the collection of sharp signals to be connected to the channels can include all of one sharp signal or one of each signal or some other collection.

Figure 4:
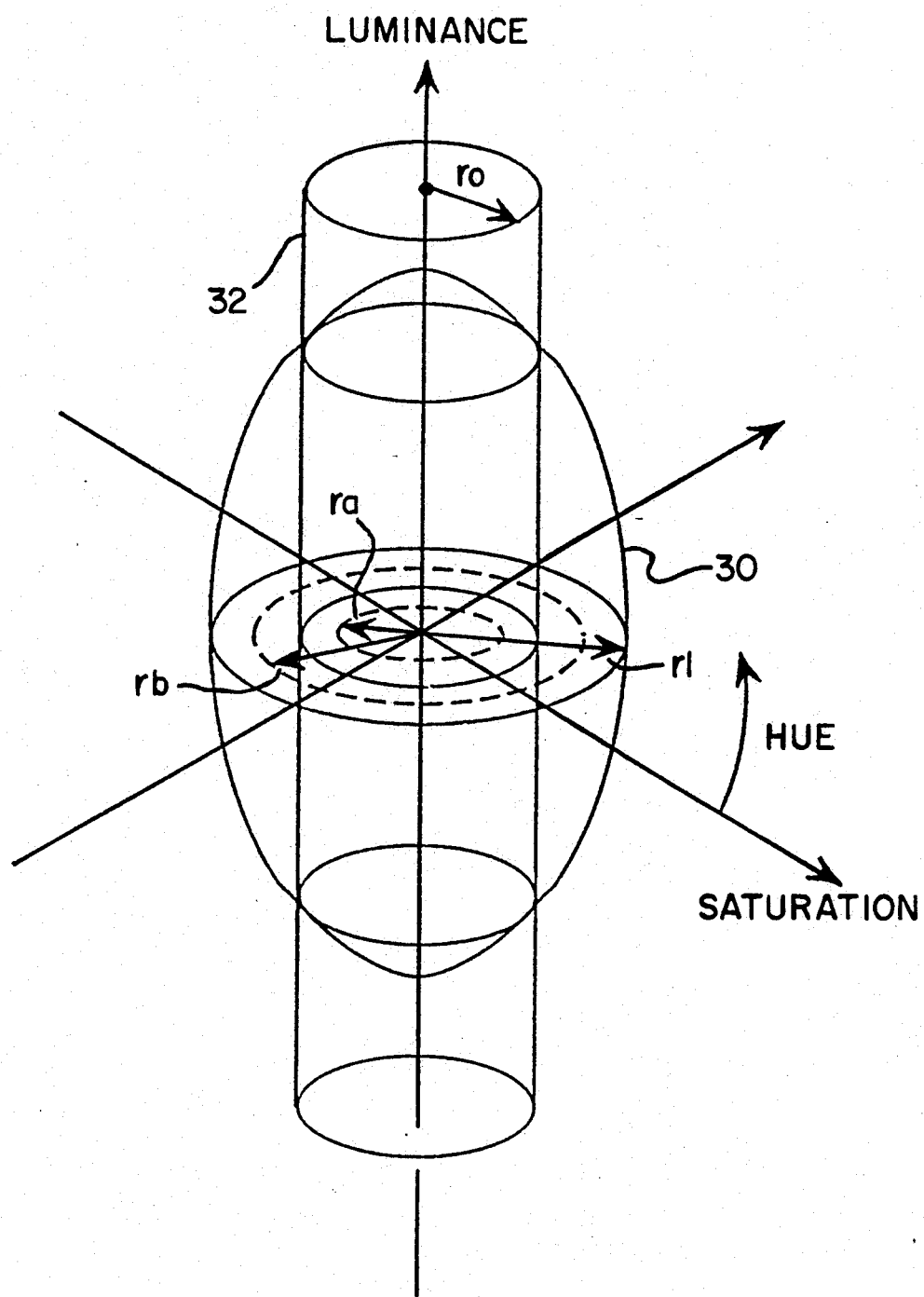
FIG. 4 is a graphic illustration of a division of the Munsell Color Solid of FIG. 3 useful in an alternative embodiment of the invention of FIGS. 1 and 2.

A more gradual change between any two sharpening modes can be implemented with an alternative division of the Solid 30 as shown in FIG. 4. Three new radii $r_a$ and $r_b$ and $r_1$ along the luminance axis are defined as follows:

$$0 <= r_a <= r_0 \quad (1)$$

$$r_0 < r_b <= r_1 \quad (2)$$

and $r_1$ is the outer radius of the Solid 30.

For only two modes, the area with radii of less than $r_0$ typically defines a first mode and the area with radii between $r_0$ and $r_1$ defines a second mode. For example, the first mode might be that all color separation signals R, G and B receive the sharp signal $G_e$. The second mode might be that each color separation R, G or B receives its corresponding sharp signal, $R_e$, $G_e$ or $B_e$.

In accordance with this alternative embodiment of the present invention, a gradual change between the two modes can be produced as follows.

If the color of a pixel has a radius r which falls within the area of the Solid 30 between 0 and $r_a$, the first mode is operative. If the radius r falls within the area of the Solid 30 between $r_b$ and $r_1$, the second mode is operative. If the radius r falls within the area of the Solid 30 between $r_a$ and $r_b$, the color separations R, G and B receive a first percentage of the sharp signals $R_e$, $G_e$ and $B_e$ they receive in the first mode and a second percentage of the sharp signals they receive in the second mode, where the first percentage is defined by how close the radius r is to $r_a$ and the second percentage is defined by how close the radius is to $r_b$. The sum of the first and second percentages is equal to 1.

For the modes mentioned hereinabove, example sharp signals are as follows, where the symbol $<=$ indicates reception.

$$R <= R_e*(a/c) + G_e*(b/c) \quad (3)$$

$$G <= G_e*(a/c) + G_e*(b/c) \quad (4)$$

$$B <= B_e*(a/c) + G_e*(b/c) \quad (5)$$

where $$a = (r - r_a) \quad (6)$$

$$b = (r_b - r) \quad (7)$$

$$c = (r_b - r_a) \quad (8)$$

It will be noted that the Green color separation receives $G_e$ in both modes for this example.

In this example, as the radius r approaches $r_b$, the sharp signals received resemble the sharp signals received in the second mode. On the other hand, for radii r close to $r_a$, the sharp signals received resemble the sharp signals received in the first mode.

It will be appreciated that the present invention can be realized in analog or digital electronic hardware or in software operating on a suitable computer, such as an IBM PC.

It will be appreciated by persons skilled in the art that the present invention is not limited to what has been particularly shown and described hereinabove. Rather the scope of the present invention is defined only by the claims which follow:

We claim:

1. Apparatus for sharpening a color image having a multiplicity of color separation signals defining a plurality of color pixels comprising:
   means for generating at least two sharpening signals from said color separation signals;
   means for defining a plurality of modes, wherein each mode defines a summation of at least one of said at least two sharpening signals with at least one of said color separation signals;
   means for selecting a currently operative mode; and
   means for combining said color separation signals with said at least two sharpening signals in accordance with said currently operative mode,
   wherein said currently operative mode changes throughout said image.

2. Apparatus according to claim 1 and wherein said means for selecting include means for deriving said mode as a function of at least one dimension of the at least three dimensional color value of each of said plurality of color pixels.

3. Apparatus according to claim 2 and wherein said means for determining include means for separating a color solid into first, second and third volumes wherein if said three dimensional color value of a pixel falls within said first volume, a first mode is selected wherein a first group of sharpening signals are combined with said color separation signals, if said three dimensional color value of a pixel falls within said third volume, a second mode is selected wherein a second group of sharpening signals are combined with said color separation signals and if said three dimensional color value of a pixel falls within said second volume, located generally between said first and third volumes, other modes are selected wherein a combination of said first and said second groups of sharpening signals are combined with said color separation signals wherein said combination gradually changes from generally the entirety of said first group to generally the entirety of said second group.

4. Apparatus according to claim 1 and wherein said means for generating include means for performing edge detection on each of said color separation signals.

5. Apparatus according to claim 2 and wherein said means for generating include means for performing edge detection on each of said color separation signals.

6. Apparatus according to claim 3 and wherein said means for generating include means for performing edge detection on each of said color separation signals.

7. Apparatus according to claim 1 and wherein said color separation signals are in a predetermined color space and said sharpening signals are also in said predetermined color space.

8. Apparatus according to claim 2 and wherein said color separation signals are in a predetermined color space and said sharpening signals are also in said predetermined color space.

9. Apparatus according to claim 3 and wherein said color separation signals are in a predetermined color space and said sharpening signals are also in said predetermined color space.

10. Apparatus according to claim 4 and wherein said color separation signals are in a predetermined color space and said sharpening signals are also in said predetermined color space.

11. Apparatus according to claim 5 and wherein said color separation signals are in a predetermined color space and said sharpening signals are also in said predetermined color space.

12. Apparatus according to claim 6 and wherein said color separation signals are in a predetermined color space and said sharpening signals are also in said predetermined color space.

13. A method of sharpening a color image having a multiplicity of color separation signals defining a plurality of color pixels including the steps of:
   generating at least two sharpening signals from said color separation signals;
   defining a plurality of modes, wherein each mode defines a summation of at least one of said at least two sharpening signals with one of said color separation signals; and
   selecting a currently operative mode and combining said color separation signals with said at least two sharpening signals in accordance with said currently operative mode, wherein said currently operative mode changes throughout said image
   producing a composite sharpening signal from said at least two sharpening signals.

14. Method according to claim 13 and wherein said step of selecting includes the step of determining said mode as a function of at least one dimension of the at least three dimensional color value of each of said plurality of color pixels.

15. Method according to claim 14 and wherein said step of determining includes the step of separating a color solid into first, second and third volumes wherein if said three dimensional color value of a pixel falls within said first volume, a first mode is selected wherein a first group of sharpening signals are combined with said color separation signals, if said three dimensional color value of a pixel falls within said third volume, a second mode is selected wherein a second group of sharpening signals are combined with said color separation signals and if said three dimensional color value of a pixel falls within said second volume, located generally between said first and third volumes, other modes are selected wherein a combination of said first and said second groups of sharpening signals are combined with said color separation signals wherein said combination gradually changes from generally the entirety of said first group to generally the entirety of said second group.

16. Method according to claim 13 and wherein said step of generating includes the step of performing edge detection on each of said color separation signals.

17. Method according to claim 14 and wherein said step of generating includes the step of performing edge detection on each of said color separation signals.

* * * * *

UNITED STATES PATENT AND TRADEMARK OFFICE
CERTIFICATE OF CORRECTION

PATENT NO. : 5,247,352
DATED : September 21, 1993
INVENTOR(S) : Michael NAGLER; Haim Z. MELMAN It is certified that error appears in the above-indentified patent and that said Letters Patent is hereby corrected as shown below:

On the Title Page, item 73, please correct the Assignee from "Scintex" to --Scitex--.

Signed and Sealed this

Second Day of August, 1994

Attest:

BRUCE LEHMAN

Attesting Officer     Commissioner of Patents and Trademarks